(12) United States Patent
Moll

(10) Patent No.: US 6,279,422 B1
(45) Date of Patent: Aug. 28, 2001

(54) ENDPLAY ADJUSTMENT MECHANISM FOR COLINEAR SHAFTS

(75) Inventor: Scott R. Moll, Waterloo, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/189,532

(22) Filed: Nov. 10, 1998

(51) Int. Cl.$^7$ .................................................. F16H 57/02
(52) U.S. Cl. ............................ 74/606 R; 475/83; 60/487
(58) Field of Search ............................ 74/606 R, 607, 74/689; 475/74, 83, 160; 60/464, 487, 489; 180/305, 307

(56) References Cited

U.S. PATENT DOCUMENTS

| | | | |
|---|---|---|---|
| 5,142,940 | * | 9/1992 | Hasegawa ........................ 74/606 R |
| 5,616,092 | * | 4/1997 | Hauser et al. ........................ 475/83 |
| 5,771,758 | * | 6/1998 | Hauser ........................ 74/606 R |
| 5,979,271 | * | 11/1999 | Louis et al. ........................ 60/487 X |

FOREIGN PATENT DOCUMENTS

1810040 * 8/1969 (DE) ........................ 60/487

* cited by examiner

Primary Examiner—Vinh T. Luong
(74) Attorney, Agent, or Firm—Harness, Dickey & Pierce, P.L.C.

(57) ABSTRACT

An endplay adjustment mechanism for a co-linear shaft assembly. More specifically, the co-linear shaft assembly includes an input shaft and a mainshaft aligned along a common longitudinal axis. A threaded adjuster plug and a thrust bearing are interdisposed between the input shaft and the mainshaft to permit relative longitudinal positioning therebetween. Accordingly, after the shaft assembly has been assembled into a power transmission device, the threaded adjuster plug is tightened to effectively increase the length of the co-linear shaft assembly, thereby eliminating any excess endplay of the shafts relative to the housing of the power transmission apparatus.

20 Claims, 7 Drawing Sheets

ENDPLAY ADJUSTMENT MECHANISM FOR COLINEAR SHAFTS

BACKGROUND OF THE INVENTION

The present invention relates generally to an arrangement for adjusting the axial positioning of a pair of colinear shafts in a power transmission apparatus and, more specifically, to an endplay adjuster assembly disposed between the colinear input shaft and mainshaft of a four-wheel drive transfer case.

Many power transmission apparatuses (i.e., transfer cases, transmissions, transaxles, etc.) of the type used in the driveline of motor vehicles are equipped with a pair of colinear and relatively rotatable shafts and a clutch mechanism for transferring drive torque therebetween. For example, a conventional transfer case 10 is shown in FIG. 1 to include a housing assembly 12, an input shaft 14, a planetary gearset 16 driven by input shaft 14, a mainshaft or rear output shaft 18, and a range clutch 20 operable for selectively coupling rear output shaft 18 for rotation with one of input shaft 14 and an output 22 of planetary gearset 16. Transfer case 10 also includes a front output shaft 24, a drive sprocket 26 fixed to front output shaft 24, a drive sprocket 28 rotatably mounted on rear output shaft 18, a chain assembly 30 interconnecting driven sprocket 26 to drive sprocket 28, and a mode clutch 32 operable for selectively coupling drive sprocket 28 to rear output shaft 18. A shift mechanism 34, under the control of the vehicle operator, is connected to range clutch 20 and mode clutch 32 to facilitate coordinated actuation thereof for establishing various drive modes.

Input shaft 14 is shown to be rotatably supported in a front housing section 12a by a front bearing assembly 36. Likewise, rear output shaft 18 has a pilot hub 38 formed on its forward end which is rotatably supported by a needle bearing assembly 40 that is retained in a pilot bore 42 formed in input shaft 14. The rearward end of rear output shaft 18 is rotatably supported from rear housing section 12b by a rear bearing assembly 44. Thus, input shaft 14 and rear output shaft 18 are colinear and supported for rotation about a common rotary axis "A". In addition, a cup plug 46 seals pilot hub 38 of rear output shaft 18 relative to input shaft 14.

During assembly of transfer case 10, an inner race 36a of front bearing assembly 36 is slid onto input shaft 14 until it abuts a radial shoulder surface 48 formed thereon and a snap ring 50 is then mounted in a circumferential groove 51 formed in input shaft 14, thereby retaining front bearing assembly 36 on input shaft 14. Input shaft 14 is then installed into housing section 12a such that an outer race 36b of front bearing assembly 36 engages a radial shoulder surface 52 of housing section 12a and then a snap ring 54 is mounted in a circumferential groove 55 formed in housing section 12a, thereby axially positioning and restraining input shaft 14 relative thereto. Alternatively, front bearing assembly 36 could be initially mounted to housing section 12a with input shaft 14 thereafter installed in front bearing assembly 36 and snap ring 50 mounted in the groove 51 formed in input shaft 14.

During continuation of the assembly of transfer case 10, an inner race 44a of rear bearing assembly 44 is slid onto rear output shaft 18 and is axially restrained between a pair of snap rings 56a and 56b mounted in circumferential grooves 57a and 57b formed in rear output shaft 18 respectively. Thereafter, rear output shaft 18 is installed in housing section 12b such that outer race 44b of rear bearing assembly 44 abuts a radial shoulder surface 58 of housing section 12b and then a snap ring 60 is mounted in a corresponding groove 61 formed in housing section 12b. Alternatively, rear bearing assembly 44 could initially be installed in housing section 12b with rear output shaft 18 slid into its inner race 44a followed by installation of snap ring 56b. As seen, a hole 62 in housing section 12b provides the requisite access to install snap ring 60 and is then sealed by a rubber housing plug 64. Once pilot hub 38 of rear output shaft 18 is mounted in pilot bore 42, housing sections 12a and 12b are then interconnected in a manner well known in the art.

In such colinear shaft layouts, the machining tolerances for the groove location, groove width, shoulder locations, and the snap ring width, in conjunction with the necessary design assembly clearances, may stack up to permit an excessive amount of axial movement (i.e., "endplay") between input shaft 14 and rear output shaft 18 Such endplay has been recognized as contributing to driveline noise or clunk and may also cause increased wear of the driveline components.

SUMMARY OF THE INVENTION

Accordingly, the present invention is directed to overcome the disadvantages associated with prior art colinear shaft assemblies by providing an endplay adjustment assembly which facilitates axial adjustment of the colinear shafts in a power transmission apparatus to accommodate tolerance variations between the various driveline components.

In accordance with the present invention, a preferred embodiment of the endplay adjustment assembly includes an endplay adjuster plug and a thrust bearing operably disposed between a first shaft and a second shaft rotatably supported from a housing. More specifically, the first shaft has a pilot bore for receiving and rotatably supporting one end of the second shaft. The endplay adjustment assembly is operably disposed in the pilot bore between the first shaft and the second shaft. The adjuster plug has external threads which engage internal threads formed in the pilot bore. The thrust bearing is disposed between the adjuster plug and the end of the second shaft. First and second bearing assemblies rotatably support the first shaft and second shaft within the housing. More specifically, bearing seats formed on the shafts and in the housing receive the bearing assemblies. Thereafter, the threaded adjuster plug is tightened to axially displace the first shaft relative to the second shaft, thereby forcing the first bearing assembly against its bearing seats while also forcing the second bearing assembly against its bearing seats. After appropriate tightening of the adjuster plug, the axial positioning of the shafts is optimized in a manner which is independent of machining tolerances, thereby eliminating endplay of the shaft assembly.

The present invention is particularly applicable to eliminate endplay in the shaft assembly of a four-wheel drive transfer case, thereby eliminating driveline clunk caused by such endplay. Furthermore, the present invention eliminates the conventional use of snap rings and the need to machine snap ring grooves in the housing and on the shafts. As such, the present invention greatly reduces the axial tolerance stack ups for allowing more precise positioning of critical components and less misalignment therein. As a further advantage, the present invention allows a press fit rather than a slip fit with the first and second bearing assemblies, thus improving bearing durability and overall alignment. As yet an additional advantage, the present invention provides faster and easier assembly and disassembly of the transfer case by eliminating the snap rings and rubber plugs.

Additional advantages and features of the present invention will become apparent from the following description and appended claims taken in conjunction with the accompanying drawings.

BRIEF DESCRIPTION OF THE DRAWINGS

Additional objects, features and advantages of the present invention will be readily apparent from the following detailed specification and the appended claims which, when taken in conjunction with the accompanying drawings, set forth the best mode currently contemplated for carrying out the invention. Referring to the drawings:

DETAILED DESCRIPTION OF THE INVENTION

In general, the present invention is directed to an arrangement for adjusting the axial positioning between a pair of colinear shafts rotatably supported from a housing in a manner to eliminate relative axial movement (i.e., "endplay") therebetween. In this regard, the present invention is particularly applicable for use in a motor vehicle power transmission apparatus such as, for example and without limitation, transfer cases, transmissions and transaxles. As discussed in further detail hereafter, the present invention provides means for eliminating the axial endplay by axially positioning a first shaft with respect to a second shaft.

Figure 1:
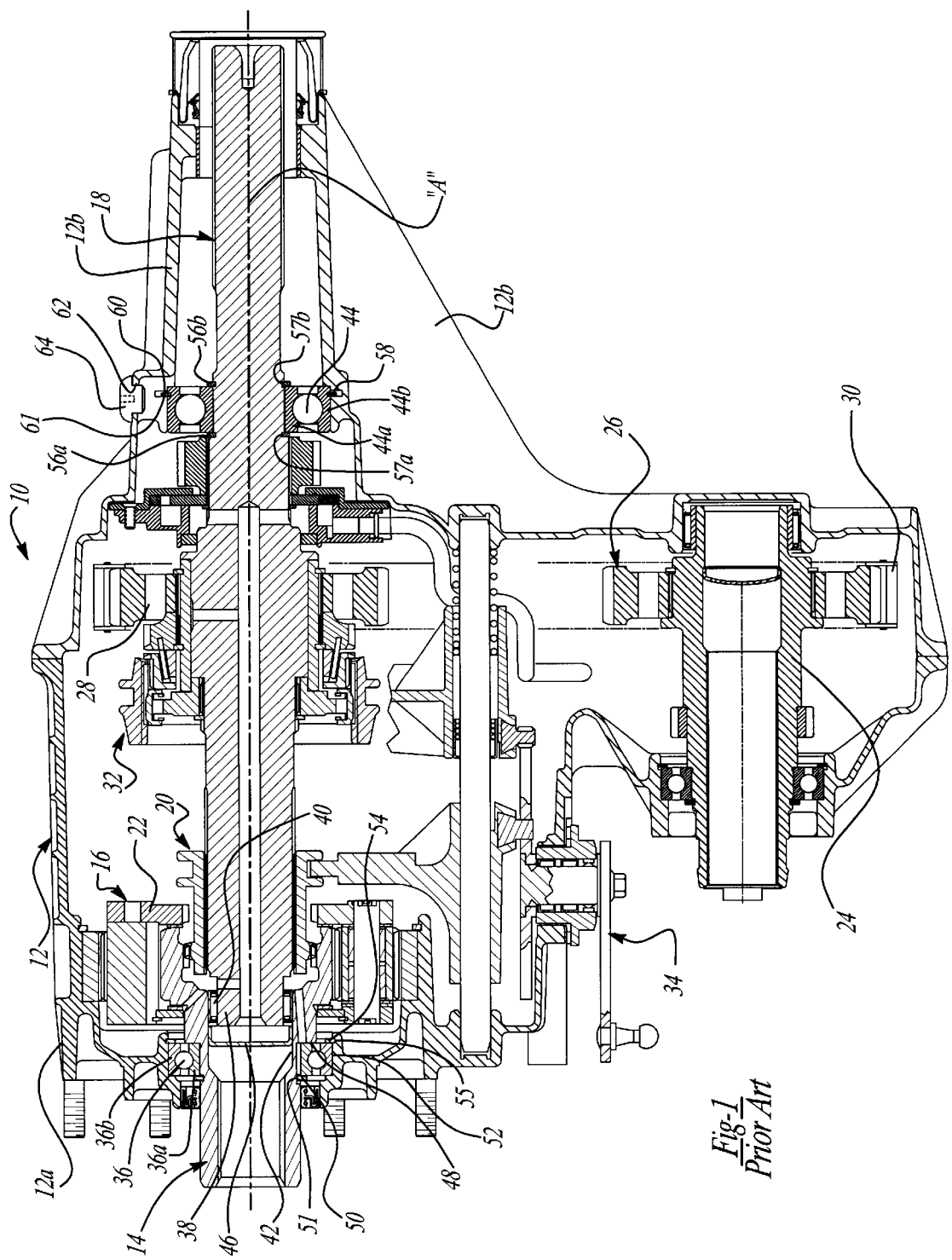
FIG. 1 is a sectional view of a conventional transfer case.
Figure 2:
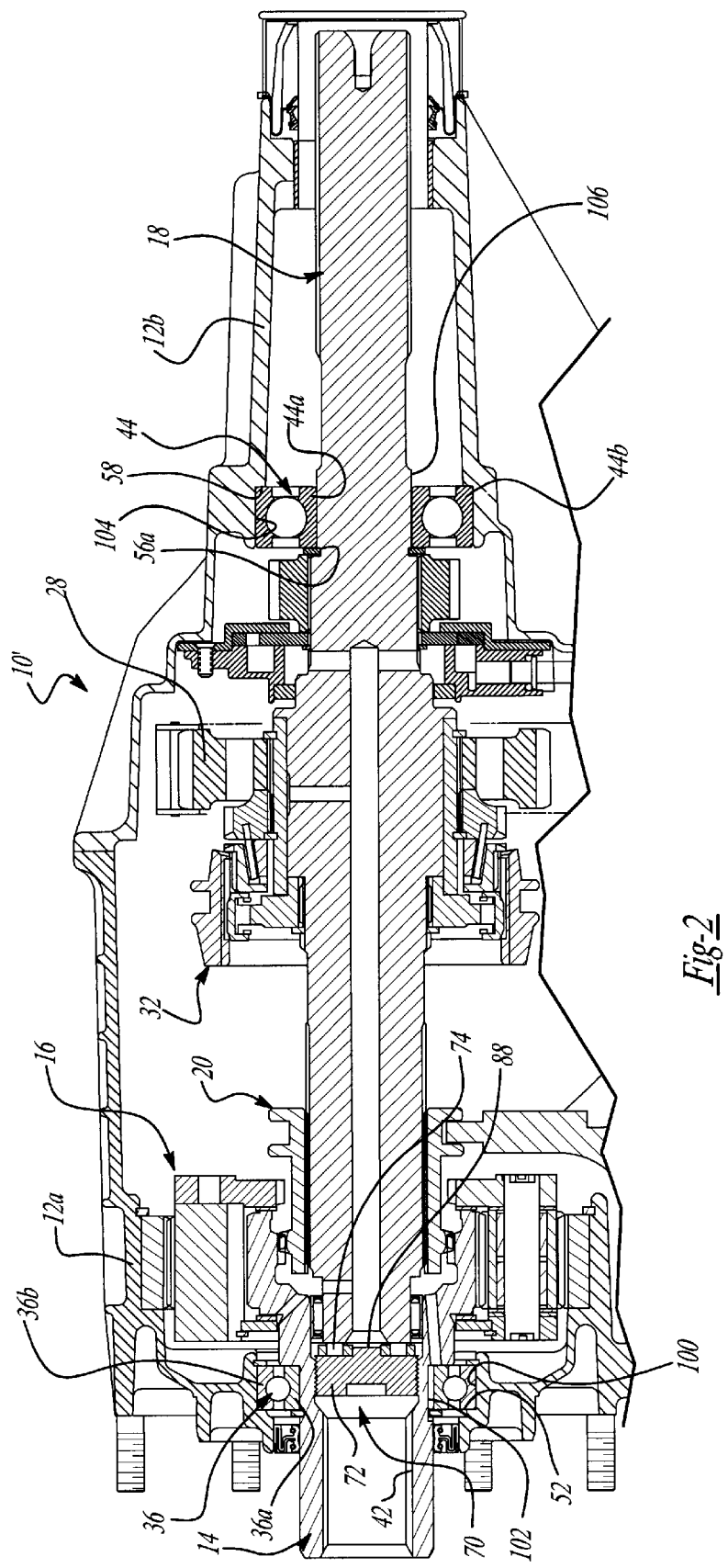
FIG. 2 is a sectional view of a portion of the transfer case shown in FIG. 1 now equipped with an endplay adjustment assembly according to the present invention.
Figure 3:
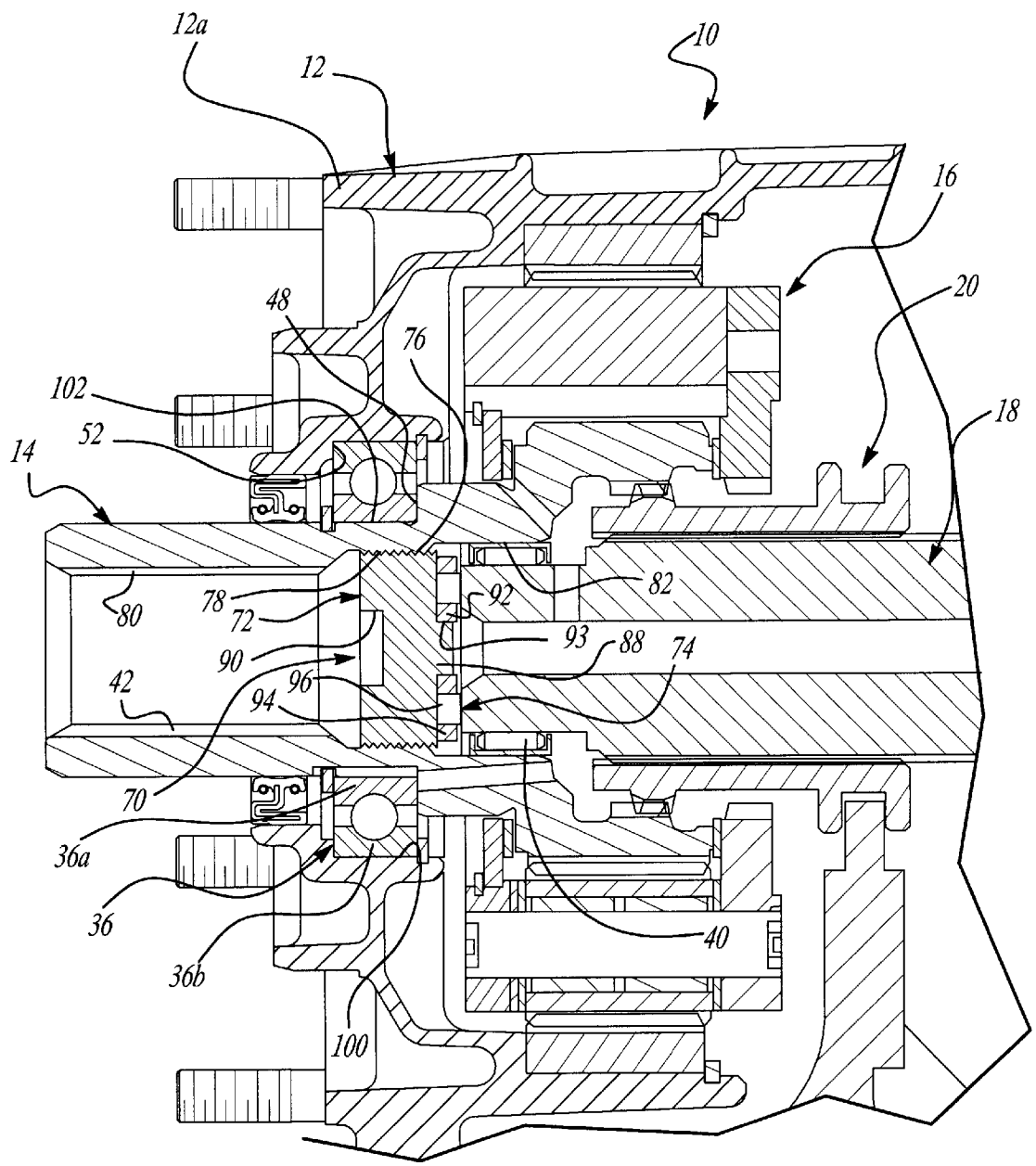
FIG. 3 is an enlarged partial view taken from FIG. 2 showing the endplay adjustment assembly in greater detail.
Figure 4:
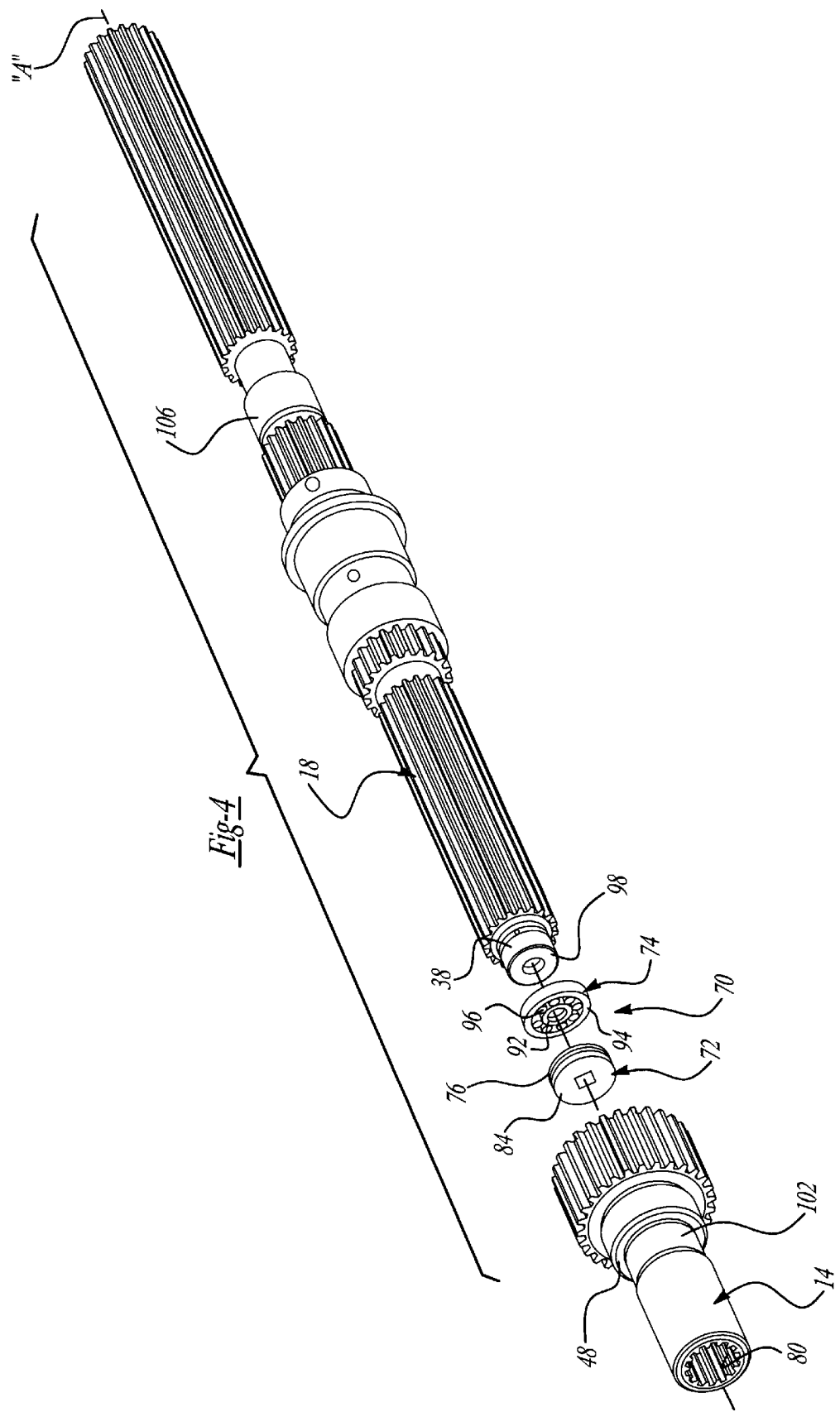
FIG. 4 is an exploded perspective view showing the colinear shaft layout and the components of the endplay adjustment assembly in association therewith.
Figure 5:
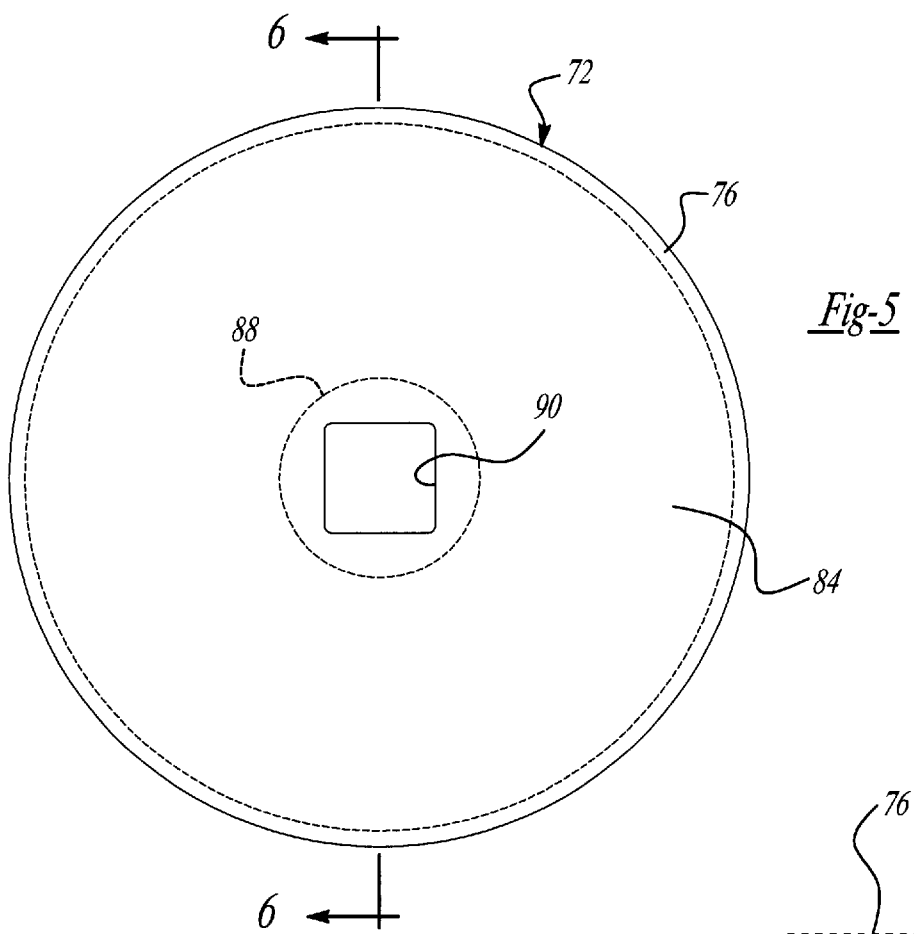
FIG. 5 is an end view of the adjuster plug associated with the endplay adjustment assembly.
Figure 6:
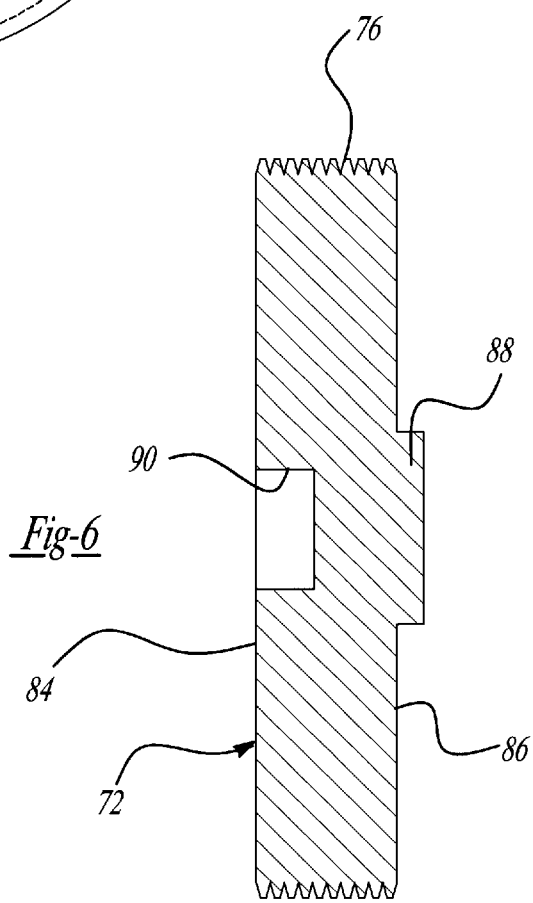
FIG. 6 is a sectional view taken along line 6—6 of FIG. 5.

Referring now to FIGS. 2 through 6, an apparatus, hereinafter referred to as endplay adjustment assembly 70, is shown installed in transfer case 10' and which is operable for permitting adjustment of the endplay between input shaft 14 and rear output shaft 18. To this end, endplay adjustment assembly 70 is incorporated into transfer case 10' in a manner permitting elimination of cup plug 46, housing plug 64, snap rings 50, 54, 56b and 60 in addition to the machining of hole 62 and the numerous snap ring grooves 51, 55, 57b and b1 associated with transfer case 10 of FIG. 1.

In general, endplay adjustment assembly 70 is operably disposed between input shaft 14 and rear output shaft 18 and includes an adjuster plug 72 and a thrust bearing assembly 74. Adjuster plug 72 includes external threads 76 that are adapted to be threaded onto internal threads 78 formed on an intermediate segment of pilot bore 42 in input shaft 14 which is located between an internally-splined segment 80 and a bearing surface segment 82. Adjuster plug 72 further includes a front face surface 84, a rear face surface 86, and a cylindrical pilot rim 88 which extends axially from rear face surface 86. Adjuster plug 72 also includes a drive socket 90 formed in front face surface 84 to enable threaded adjustment of the axial position of adjuster plug 72 relative to input shaft 14. As presently preferred, adjuster plug 72 is made from steel heat-treated to a hardness of approximate fifty-eight to sixty Rockwell C (RC 58–60). Furthermore, a layer of a locking thread sealer or equivalent compound is applied to threads 76 and/or 78 to secure and seal threaded adjuster plug 72 within input shaft 14, thereby eliminating the need for use of cup plug between input shaft 14 and rear output shaft 18.

Thrust bearing assembly 74 has an inner race 92 defining an aperture 93 adapted to be concentrically mounted on pilot rim 88 of adjuster plug 72, an outer race 94, and needle bearings 96 retained between inner race 92 and outer race 94. Needle bearing 96 are adapted to contact rear face surface 86 of adjuster plug 72 and an end face 98 of pilot hub 38 on rear output shaft 18. While thrust bearing assembly 74 is disclosed as being of the needle bearing type, those skilled in the art will appreciate that any equivalent thrust-type bearing assembly or thrust plate can be used in substitution therefor.

During assembly of transfer case 10', outer race 36b of front bearing assembly 36 is press-fit into an annular boss 100 formed in housing section 12a into abutting engagement with radial shoulder surface 52. Thereafter, input shaft 14 is slid through the central aperture in inner race 36a of front bearing assembly 36 until inner race 36a rests on outer bearing surface 102 of input shaft 14 and abuts radial shoulder 48 of input shaft 14. Thus, front bearing assembly 36 is seated between shoulder surfaces 48 and 52 when input shaft 14 is rotatably installed in housing section 12a. Either before or after installation of input shaft 14 into housing section 12a, adjuster plug 72 is threaded into the intermediate segment of pilot bore 42 to a predefined axial position relative thereto.

Outer race 44b of rear bearing assembly 44 is press-fit into an annular boss 104 formed in housing section 12b into abutting engagement with radial shoulder 58. Thereafter, rear output shaft 18 is slid through the central aperture in inner race 44a of rear bearing assembly 44 until inner race 44a rests on outer bearing surface 106 of rear output shaft 18 and abuts snap ring 56a. Thus, rear bearing assembly 44 is seated between shoulder surface 58 and snap ring 56a when rear output shaft is rotatably installed in housing section 12b. With thrust bearing assembly 74 journally mounted on pilot rim 88 of adjuster plug 72, pilot hub 38 of rear output shaft 18 is positioned within pilot bore 42. Once the components are properly aligned, housing sections 12a and 12b are interconnected to define housing assembly 12. The sequence of operations disclosed for assembly of transfer case 10 is exemplary and is not intended to limit the present invention.

Once transfer case 10' is assembled, a drive tool is inserted into pilot bore 42 of input shaft 14 and its square drive lug is inserted into drive socket 90 in adjuster plug 72. Rotation of the drive lug causes rotation of adjuster plug 72 for moving adjuster plug 72 in pilot bore 42 from its predefined position toward end face surface 98 of rear output shaft 18. As a result, thrust bearing assembly 74 is tightened against end face surface 98 of rear output shaft 18. The reaction forces that result from this tightening process cause forward axial movement of input shaft 14 relative to housing section 12a for seating and loading front bearing assembly 36 against shaft shoulder 48 and housing shoulder 52. The tightening of adjuster plug 72 also causes rearward axial movement of rear output shaft 18 relative to input shaft 14 and housing section 12b for seating and loading rear bearing assembly 44 against snap ring 56a and housing shoulder 58. In this manner, input shaft 14 is tightly seated against housing section 12a and rear output shaft 18 is tightly seated against housing section 12b independent of machining tolerances or stack-ups associated with the components. Adjuster plug 72 can be variably tightened to minimize or completely eliminate endplay between colinear shafts 14 and 18. Preferably, the drive tool is a power-operated drive wrench capable of quickly tightening adjuster plug 72 in a high volume production environment.

Figure 7:
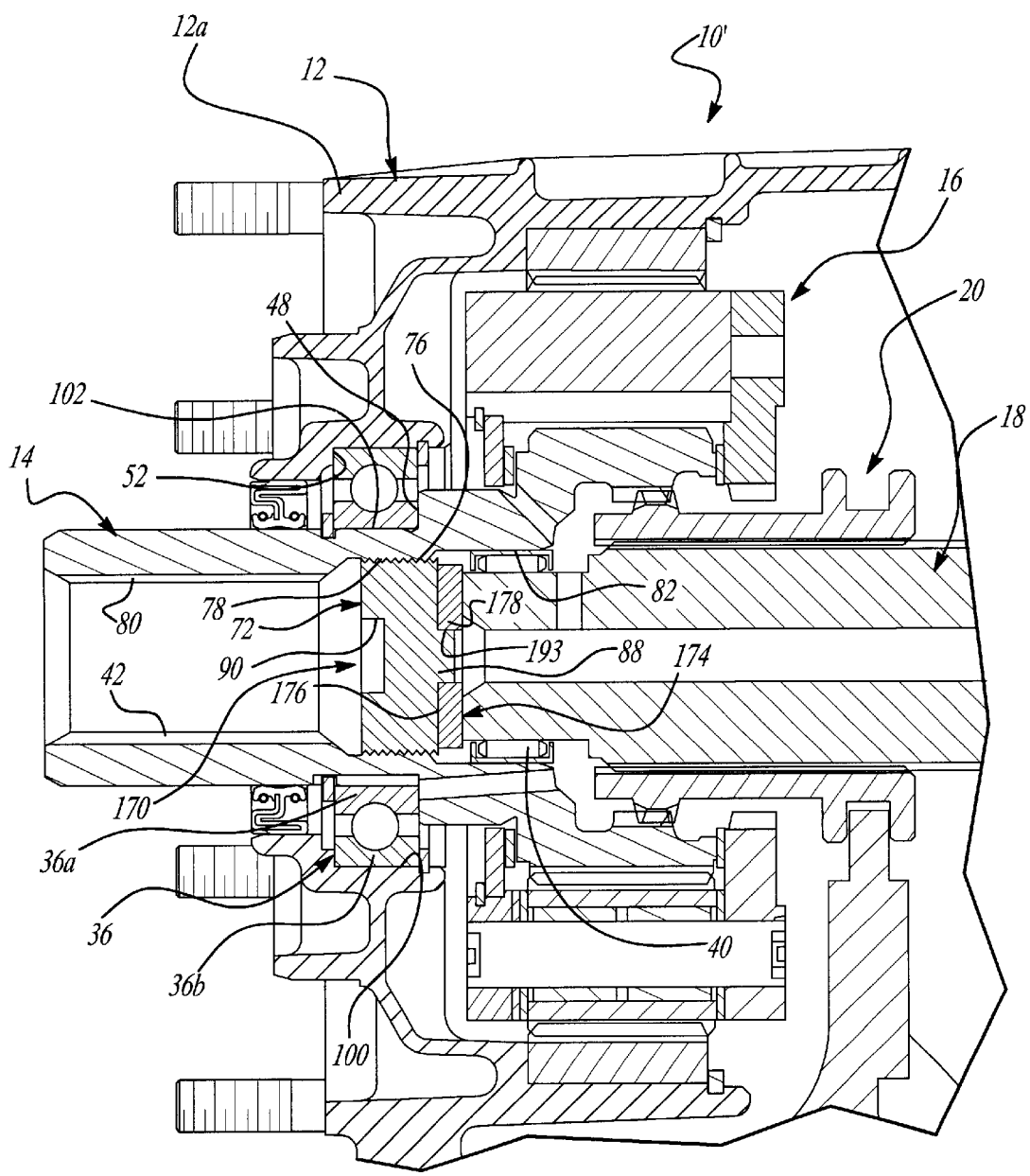
FIG. 7 is a sectional view showing the endplay adjustment assembly according to an alternative embodiment of the present invention.

Referring now to FIG. 7, transfer case 10' is now shown equipped with an endplay adjustment assembly 170 which is substantially similar to endplay adjustment assembly 70 except that thrust bearing assembly 74 is now replaced with a thrust plate 174. Thrust plate 174 has a front face surface 176 adapted to engage rear face surface 86 of adjuster plug 72 and a rear face surface 178 adapted to engage end face surface 98 of pilot hub 38 on rear output shaft 18. Thrust plate 174 further includes an aperture 193 extending between face surfaces 176 and 178 for journally mounting thrust plate 174 on pilot rim 88 of adjuster plug 72. As before, tightening of adjuster plug 72 relative to input shaft 14 causes thrust plate 174 to engage end surface 98 of pilot hub 38 on rear output shaft 18 for taking up axial clearances between input shaft 14 and housing section 12a and between rear output shaft 18 and housing section 12b.

Figure 8:
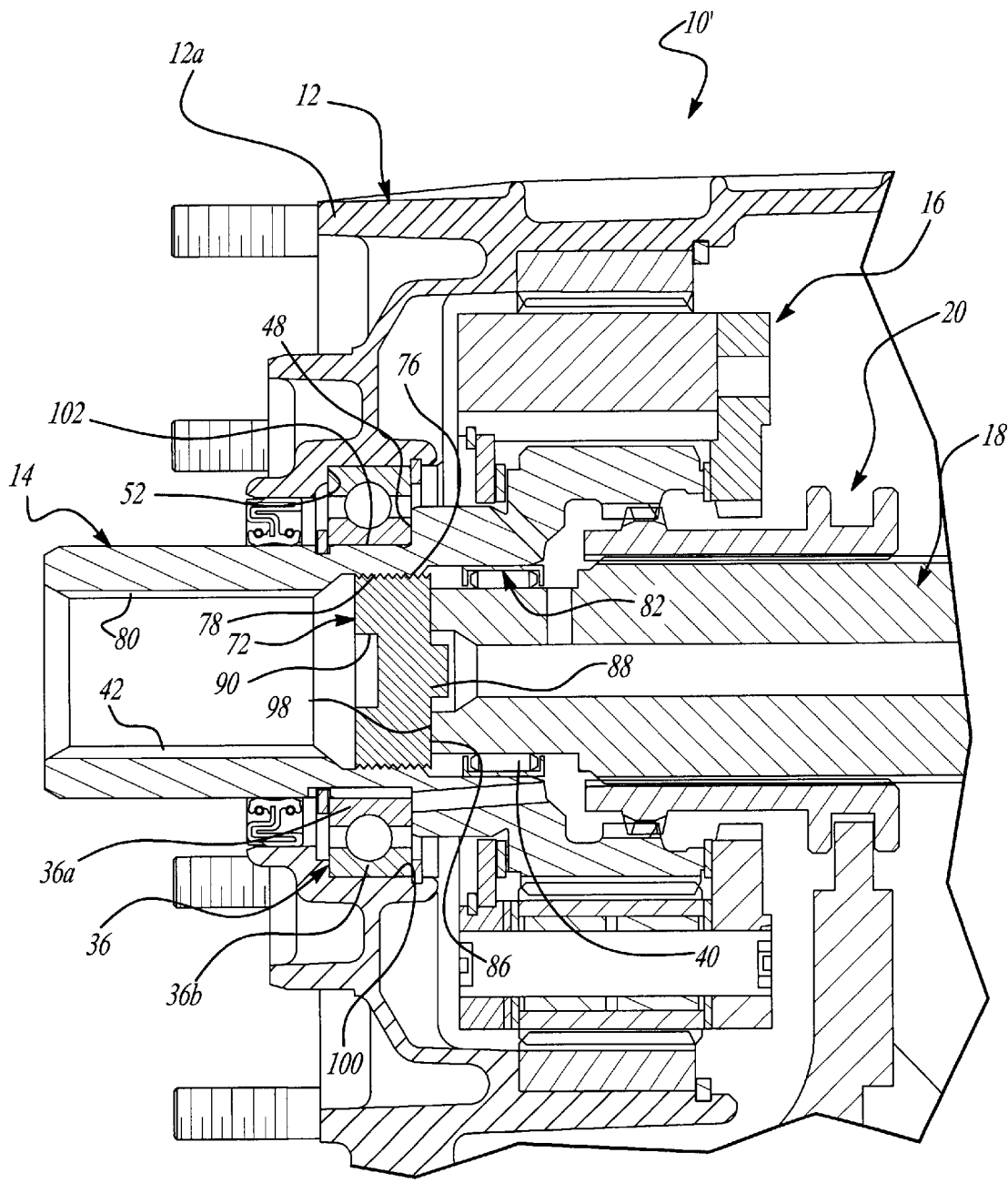
FIG. 8 is a sectional view of another alternative embodiment of the endplay adjustment assembly.

In FIG. 8, adjuster plug 72 is shown with thrust bearing assembly 74 and thrust plate 174 removed such that its rear face surface 86 is in sliding contact or close proximity to end face 98 of pilot hub 38. In this arrangement, adjuster plug 72 is initially tightened relative to input shaft 14 to take up the axial clearance in the manner previously described. Thereafter, adjuster plug 72 is rotated a small amount in the opposite direction to release any clamping loads between adjuster plug 72 and pilot hub 38 and accommodate relative rotation therebetween.

It will be appreciated that a colinear shaft assembly equipped with one of the endplay adjustment assemblies of the present invention represents a significant improvement over the art. While preferred embodiments of this invention have been disclosed herein, it should be further appreciated that modifications may be made without departing from the scope of the present invention. In addition, while various components have been disclosed in an exemplary fashion, various other components may, of course, be employed. It is intended by the following claims to cover these and other departures from the disclosed embodiments which fall within the true spirit of this invention. While shown utilized in a transfer case, one skilled in the art would readily recognize that the present invention is not limited to this application. More specifically, the present application has utility in numerous driveline components which utilize colinear shaft assemblies such as transmissions, differential, and other power transmission apparatuses. Thus, one skilled in the art would recognize the utility of the present invention over and above its use in the transfer case disclosed and illustrated herein.

What is claimed is:

1. A power transmission apparatus comprising:
a housing defining first and second bearing seats;
a colinear shaft assembly including a first shaft defining a third bearing seat, and a second shaft defining a fourth bearing seat;
a first bearing assembly disposed between said first and third bearing seats for supporting said first shaft for rotation relative to said housing about a rotary axis;
a second bearing assembly disposed between said second and fourth bearing seats for supporting said second shaft for rotation relative to said housing and said first shaft about said rotary axis; and
an endplay adjustment assembly coupled to said first shaft and which engages said second shaft, the axial position of said endplay adjustment assembly relative to said first shaft is adjustable for causing relative axial movement between said first shaft and said second shaft.

2. The power transmission apparatus of claim 1 wherein said first shaft includes a pilot bore with one end of said second shaft rotatably supported in said pilot bore and wherein said endplay adjustment assembly is disposed in said pilot bore of said first shaft and engages said one end of said second shaft.

3. The power transmission apparatus of claim 2 wherein said endplay adjustment assembly includes an adjuster plug having external threads meshed with internal threads formed in said pilot bore such that rotation of said adapter plug causes relative axial movement between said first shaft and said housing for eliminating axial clearances between said first bearing assembly and said first and third bearing seats.

4. The power transmission apparatus of claim 3 wherein said rotation of said adjuster plug further causes relative axial movement of said second shaft relative to said first shaft for eliminating axial clearances between said second bearing assembly and said second and fourth bearing seats.

5. The power transmission apparatus of claim 3 wherein said end play adjustment assembly further includes a thrust bearing disposed between said adapter plug and said one end of said second shaft.

6. The power transmission apparatus of claim 5 wherein said thrust bearing is an assembly including an inner race mounted on a rim segment of said adjuster plug, an outer race, and needle bearings retain ed between said inner and outer races, said needle bearings engaging a face surface of said adjuster plug and an end surface of said second shaft.

7. The power transmission apparatus of claim 3 wherein said adjuster plug includes a drive socket adapted to receive a drive lug of a tool for rotating said adjuster plug to vary the axial position between said adjuster plug and said first shaft due to the threaded engagement therebetween.

8. The power transmission apparatus of claim 2 wherein said first bearing seat is a first radial shoulder extending from said housing, said second bearing seat is a second radial shoulder extending from said housing, said third bearing seat is a radial shoulder extending from said first shaft and said fourth bearing seat is a radial shoulder extending from said second shaft.

9. A power transmission apparatus having a co-linear shaft assembly, said power transmission apparatus comprising:
a first housing having a first housing bearing seat formed therein;
a first shaft having a first shaft bearing seat formed on an outer surface thereof, and a bore formed therethrough to define an inner surface;
a first bearing assembly operably disposed between said first housing bearing seat and said first shaft bearing seat to rotatably support said first shaft in said first housing;
a second housing adapted to be releasably secured to said first housing, said second housing having a second housing bearing seat formed therein;
a second shaft disposed along a common longitudinal axis with said first shaft, said second shaft having a second shaft bearing seat formed on an outer surface thereof;

a second bearing assembly operably disposed between said second housing bearing seat and said second shaft bearing seat to rotatably support said second shaft in said second housing;

a third bearing assembly operably disposed between said inner surface of said bore in said first shaft and an end segment of said second shaft to rotatably support said second shaft in said bore of said first shaft; and an endplay adjustment assembly disposed in said bore and coupled to said first shaft, said endplay adjustment assembly being adjustable along said longitudinal axis to longitudinally position said first shaft relative to said second shaft.

10. The power transmission apparatus of claim 9 wherein said endplay adjustment assembly engages said end segment of said second shaft such that adjustment of its longitudinal position causes relative axial movement of said second shaft relative to said second housing.

11. The power transmission apparatus of claim 10 wherein said endplay adjustment assembly includes an adjuster plug disposed within said bore and threadingly coupled to said first shaft.

12. The power transmission apparatus of claim 11 wherein said endplay adjustment assembly further comprises a fourth bearing assembly disposed within said bore between said adjuster plug and said end segment of said second shaft.

13. The power transmission apparatus of claim 12 wherein said fourth bearing assembly includes an inner race mounted on a rim segment of said adjuster plug, an outer race, and needle bearings retained between said inner and outer races, said needle bearings engaging a face surface of said adjuster plug and an end surface of said second shaft.

14. The power transmission apparatus of claim 11 wherein said adjuster plug includes a drive socket adapted to receive a drive lug of a tool for rotating said adjuster plug to vary the axial position between said adapter plug and said first shaft due to the threaded engagement therebetween.

15. The power transmission apparatus of claim 10 wherein said first housing bearing seat is a first radial shoulder extending from said first housing, said second housing bearing seat is a second radial shoulder extending from said second housing, said first bearing seat is a radial shoulder extending from said first shaft and said fourth bearing seat is a radial shoulder extending from said second shaft.

16. A power transmission apparatus equipped with a co-linear shaft assembly, said power transmission device comprising:

a first housing having a first housing bearing seat formed therein;

a first shaft having a first shaft bearing seat formed thereon and a pilot bore formed therethrough with an inner surface having a threaded segment and a non-threaded segment;

a first bearing assembly operably disposed between said first housing bearing seat and said first shaft bearing seat to rotatably support said first shaft in said first housing;

a second housing adapted to be releasably secured to said first housing, said second housing having a second housing bearing seat formed therein;

a second shaft aligned on a common longitudinal axis with said first shaft and having a second shaft bearing seat formed thereon;

a second bearing assembly operably disposed between said second housing bearing seat and said second shaft bearing seat to rotatably support said second shaft in said second housing;

a third bearing assembly operably disposed between said non-threaded segment of said pilot bore in said first shaft and an end segment of said second shaft to rotatably support said end segment of said second shaft in said pilot bore of said first shaft;

an adjuster plug having external threads that are meshed with said threaded segment of said pilot bore; and a thrust bearing engaging said adjuster plug and said end segment of said second shaft.

17. The power transmission apparatus of claim 16 wherein said external threads on said adjuster plug are meshed with internal threads formed in said pilot bore such that rotation of said adjuster plug causes relative axial movement between said first shaft and said first housing for eliminating axial clearances between said first bearing assembly and said first shaft bearing seat and said first housing bearing seat.

18. The power transmission apparatus of claim 17 wherein said rotation of said adjuster plug causes relative axial movement of said second shaft relative to said first shaft for eliminating axial clearances between said second bearing assembly and said second shaft bearing seat and said second housing bearing seat.

19. The power transmission apparatus of claim 16 wherein said thrust bearing includes an inner race mounted on a rim segment of said adjuster plug, an outer race, and needle bearings retained between said inner and outer races, said needle bearings engaging a face surface of said adjuster plug and an end surface of said second shaft.

20. The power transmission apparatus of claim 16 wherein said adjuster plug includes a drive socket adapted to receive a drive lug of a tool for rotating said adjuster plug to vary the axial position between said adjuster plug and said first shaft due to the threaded engagement therebetween.

* * * * *

UNITED STATES PATENT AND TRADEMARK OFFICE
CERTIFICATE OF CORRECTION

PATENT NO. : 6,279,422 B1 Page 1 of 1
DATED : August 28, 2001
INVENTOR(S) : Scott R. Moll It is certified that error appears in the above-identified patent and that said Letters Patent is hereby corrected as shown below:

Title page,
Item [56], References Cited, please include the following:

```
-- 1,634,091    06/1927    Bethune et al. --
-- 1,174,010    12/1929    Engelhardt --
-- 1,885,156    11/1932    Thomas et al. --
-- 1,950,580    03/1934    Thomas --
-- 2,005,167    06/1935    Roeder --
-- 2,322,394    06/1943    Sharpe --
-- 4,825,726    05/1989    Schofield --
```

Column 3,
Line 56, "b1" should be -- 61 --.

Column 6,
Line 35, "retain ed" should be -- retained --.

Signed and Sealed this

Twelfth Day of November, 2002

*Attest:*

*Attesting Officer*

JAMES E. ROGAN
*Director of the United States Patent and Trademark Office*